United States Patent
Welle

(10) Patent No.: US 11,212,187 B1
(45) Date of Patent: Dec. 28, 2021

(54) NETWORK TOPOLOGY COMPRISING N-HOP LOCAL NEIGHBORHOODS

(71) Applicant: The Aerospace Corporation, El Segundo, CA (US)

(72) Inventor: Richard P. Welle, Huntington Beach, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 0 days.

(21) Appl. No.: 16/990,648

(22) Filed: Aug. 11, 2020

(51) Int. Cl.
*H04L 12/24* (2006.01)

(52) U.S. Cl.
CPC ........ *H04L 41/145* (2013.01); *H04L 41/0654* (2013.01)

(58) Field of Classification Search
CPC .......................... H04L 41/145; H04L 41/0654
See application file for complete search history.

(56) References Cited

U.S. PATENT DOCUMENTS

| | | | | |
|---|---|---|---|---|
| 5,740,164 A * | 4/1998 | Liron | ..................... | H01Q 1/242 370/316 |
| 2011/0256865 A1* | 10/2011 | Sayeed | .............. | H04B 7/18589 455/427 |
| 2016/0037434 A1* | 2/2016 | Gopal | ..................... | H04L 45/02 370/316 |
| 2018/0092020 A1* | 3/2018 | Torres | ................. | H04W 40/248 |

OTHER PUBLICATIONS

Baran, P., 1964. On distributed communications networks. IEEE transactions on Communications Systems, 12(1), pp. 1-9.
Basurra, S.S., De Vos, M., Padget, J., Ji, Y., Lewis, T. and Armour, S., 2015. Energy efficient zone based routing protocol for MANETs. Ad Hoc Networks, 25, pp. 16-37.
Davies, D.W., 2001. An historical study of the beginnings of packet switching. The Computer Journal, 44(3), pp. 152-162.
Dua, A., Kumar, N. and Bawa, S., 2014. A systematic review on routing protocols for vehicular ad hoc networks. Vehicular Communications, 1(1), pp. 33-52.

* cited by examiner

*Primary Examiner* — Philip J Chea
*Assistant Examiner* — Hassan A Khan
(74) *Attorney, Agent, or Firm* — LeonardPatel PC

(57) ABSTRACT

A communications network comprising of n-hop local neighborhoods. The network includes a plurality of communication nodes and a plurality of local neighborhoods wherein each local neighborhood includes a central node around which the local neighborhood is defined. The network also includes a subset of the plurality of nodes located within the local neighborhoods of each of the central nodes. Each of the subset of the plurality of nodes in a local neighborhood is not more than n hops away over currently existing links from the central node of the local neighborhood.

17 Claims, 11 Drawing Sheets

- Local node
- Hub node

⋯⋯ Local link
— High-capacity link

- ● Central node (302)
- ○ One-hop node (304)
- △ Two-hop node (306)
- ◇ Three-hop node (308)
- □ Four-hop node (310)
- • Non-local node (312)

———— First-hop link
— — — Second-hop link
– – – – Third-hop link
———— Fourth-hop link
·········· Non-local link

- ● Central node
- ○ One-hop node
- △ Two-hop node
- ◇ Three-hop node
- □ Four-hop node
- • Non-local node ——— First-hop link
— — — Second-hop link
– – – – Third-hop link
——— Fourth-hop link
·········· Non-local link

NETWORK TOPOLOGY COMPRISING N-HOP LOCAL NEIGHBORHOODS

FIELD

The present invention relates to communications network topology and, more particularly, to developing and operating a network with n-hop local neighborhoods in space.

BACKGROUND

In its simplest form, a communication network includes a number of nodes and communication links between nodes. Each node has communication links with a finite number of other nodes in the network. With large networks, the number of direct links from any given node may be much smaller than the total number of nodes in the network. Nodes may be devices that generate or receive information but may also be communication relay points with multiple links that provide a relay service to enable communication between two nodes that are not directly connected with one another.

The terrestrial internet is a communication network that has been able to grow as fast and as much as it has because it was designed to be modular, i.e., it was designed to be used without a central authority to manage most aspects of data flow. One of the key enabling concepts is packet switching. Prior to the development of packet switching, essentially all communication networks operated on the principle of circuit switching. For example, with circuit switching, a temporary communications path between two points in a network is established by switching at nodes to connect various links and create a dedicated circuit for the duration of the communications event. A typical example in the early stages would be the telephone network. For example, a telephone call from an office in New York to a home in San Francisco would involve switchboard connections to establish a hard-wired link between the office and the home. For the duration of the call, none of the links involved could be used for other calls. However, once the call was completed, the links were released and could be used to establish other connections.

In packet switching, however, the connections (or links) in the network remain fixed on a time scale long compared to the transit time of a message through the network. A message is broken up into a series of discrete packets, each of which is given the address of the destination and sent through the network. At each node, each packet is routed to another node on any of a number of potential paths to the final destination. Once all the packets have been received at the destination, they are reassembled to recreate the original message. The network address that travels with a packet and determines its destination in terrestrial networks is the internet protocol (IP) address, a (mostly) unique identifier assigned to each device on the network.

With sufficient knowledge of the topology of the network, an optimum routing for a packet can be determined at the point of origin. In practice, it is impractical for network routers to retain full knowledge of the total network. Because of this impracticality, the full route to the destination will not necessarily be apparent at the point of origin. Instead, the structure of the IP address contains geographical and other sub-network information that allows the initial communications node to route the packet in at least the general direction the packet needs to go in order to reach the intended destination.

The key benefit of this approach is that network nodes can operate autonomously with respect to routing decisions. For instance, with this approach, there is no need for a node to defer to a central authority. This allows the entire architecture of the network to be distributed, with routing decisions made autonomously at each node, which enables essentially unlimited growth.

Routing decisions at each node are made based on routing tables that are, in turn, developed with nearly full knowledge of the network, and are updated as necessary to take into consideration network changes. In the terrestrial internet, the topology of the network is essentially static. The optimum route from a source to a destination may vary depending on traffic demands, and routing algorithms may take this into account. However, the basic set of nodes and links will not change significantly within a time scale of days to weeks, and it is possible for each node to maintain nearly complete knowledge of the full network topology and work from quasi-static routing tables based on that knowledge.

In contrast to routing, changes in the topology of terrestrial networks are not made autonomously. Because the time scale for changes in the network topology is long, and because most connections involve physical links (e.g., wires or optical fibers), there is no need for an autonomous process to make decisions about which new links to establish or which existing links to discontinue. Instead, decisions about changes in links are typically made by humans, a process called provisioning.

In space networks, communication nodes may be hosted on satellites, which are often moving relative to one another. The relative motion of the satellites may often cause the distance between two nodes to exceed practical communication link range; thus, many links will be of short duration. This will be particularly true if the space network grows incrementally with new nodes added in what may be a variety of unstructured orbits. Space networks, unlike terrestrial networks, may use only wireless communication links, with each link requiring the use of a communication terminal or port on each node. Since each node may carry only a finite number of ports, each node will be capable of establishing only a finite number of communication links, and it may not be possible to communicate simultaneously with all other nodes that may be within range. As such, decisions must be made continually, and in particular each time an existing link is broken, about how best to utilize the limited number of ports available to each node. As the network grows, it will become increasingly impractical for there to be any human involvement in provisioning. Furthermore, because of the short time scale for network topology changes, it will become impractical for any node to have complete up-to-date knowledge of the total network topology. This presents two challenges in planning and decision-making. First, the continual breaking and making of links requires decisions about which links to make (and possibly about which links to break). Thus, an alternative automated provisioning technique may be beneficial. Second, the continual changes in network topology will make it difficult, if not impossible, for each network node to maintain up-to-date routing tables. Thus, an alternative packet routing technique may be beneficial.

A terrestrial analog to a space-based dynamic network, called a mobile ad hoc network (MANET) or a vehicular ad hoc network (VANET), is a dynamic network of mobile wireless devices such as vehicles, smart phones, or other wireless-enabled devices. However, there are a few key distinctions between typical MANETs and space-based networks.

First, mobile nodes in terrestrial networks generally are free to move in ways that are not necessarily predictable, while nodes in space networks are generally in stable orbits with locations predictable, at least approximately, for days or weeks into the future. Second, links in terrestrial mobile networks can be unpredictable due to changing obstructions (buildings, terrain, weather etc.) while links in space networks are limited by range, blockage due to planetary (typically Earth) limbs, or spacecraft attitude limitations, all of which are predictable. Third, terrestrial MANETs are generally connected using relatively-broad-beamed radio frequency (RF) communication links, and most transmissions by a node are heard by any other node within range. In future space networks, however, most crosslinks will be made with optical communication systems, which are highly directional. With optical links, it is possible for one node to send a message to another node several thousand kilometers (km) away without that message being detectable by a third node that is only a few meters away from the first node (as long as the third node is not in the beam path). Optical communication is highly directional, allowing long-range contact, but it is generally incapable of flooding nearby nodes.

These characteristics of an in-space optical network are likely to lead to topologies different from those typical of terrestrial networks, either static or dynamic. For example, a typical topology for MANETs is a mesh configuration. With mesh configuration, every node is linked to some small number of nearby nodes, forming a closed mesh. See mesh network 100 of FIG. 1. In this configuration, all nodes N are nominally identical in their communication capability, and messages cross the network by hopping through a series of short links. In the terrestrial Internet, however, all nodes are not equal, and therefore, some nodes act as major hubs with large capacity links to other major hubs. Other nodes in the terrestrial Internet have only modest links to the local major hub. Thus, the topology is more of a hub-and-spoke configuration with some additional mesh characteristics, either on the local level, or among the major hubs. See, for example, FIG. 2, which is a diagram illustrating a hub and spoke network 200 with some meshing.

In an in-space optical network, particularly one in low Earth orbit (LEO), unless carefully regulated and structured, neither of these topologies is likely to prevail. The continuous relative motion of the nodes means that the short links typical of a mesh network will quickly stretch into long links unless the network is continually updated to maintain short links.

However, since optical links on the order of 5000 km will be normal for LEO satellites, the mesh will become very complex. Similarly, a hub-and-spoke configuration will not persist unless all members are in essentially the same orbit. Thus, it may be beneficial to provide provisioning and routing processes for a dynamic LEO optical network, including processes compatible with a network that includes a collection of medium-to-long-range links, even when the node density gets very large.

SUMMARY

Certain embodiments of the present invention may provide solutions to the problems and needs in the art that have not yet been fully identified, appreciated, or solved by current space-based network architectures. For example, some embodiments provide protocols for provisioning and routing in a dynamic, space-based, predominantly optical network. To allow for scalability to arbitrarily large networks, the protocols operate in a distributed manner, allowing the nodes to operate autonomously without (or with minimal) input from any central network management authority.

In an embodiment, a system may include a plurality of n-hop local neighborhoods. Each of the plurality of n-hop local neighborhoods includes a central node around which the n-hop local neighborhood is defined. The n-hop local neighborhoods also include a plurality of nodes that are no more than n hops away from the central node over currently existing links required to transmit a message between the central node and a destination node. Each one of the plurality of nodes is a central node of another group nodes considered to be within an n-hop local neighborhood for the each one of the plurality of nodes.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments pertain to developing protocols for provisioning and routing to function efficiently with only local network knowledge, thus eliminating the need to continually update large volumes of network topology information throughout the network.

Local Neighborhoods

With the expectation that most links in space networks will be highly directional and long compared to a typical physical distance to a nearest neighbor, the concept of "local" in some embodiments has a non-traditional meaning. Rather than basing the concept of locality on physical distance, locality between any two nodes may be defined in terms of the minimum number of hops (over currently-existing links) required to transmit a message between the nodes. For example, for any given node, another node may be in its local neighborhood if the other node is reached within some number n of hops. In some embodiments, an n-hop local neighborhood is defined to encompass all other nodes in the network reachable through no more than n hops. In general, no two nodes have the same local neighborhood. However, if node x is in the local neighborhood of node y, then node y will be in the local neighborhood of node x (assuming all hops are bi-directional, and all local neighborhoods are defined in terms of the same number n of hops, neither of which will always be the case).

Figure 1:
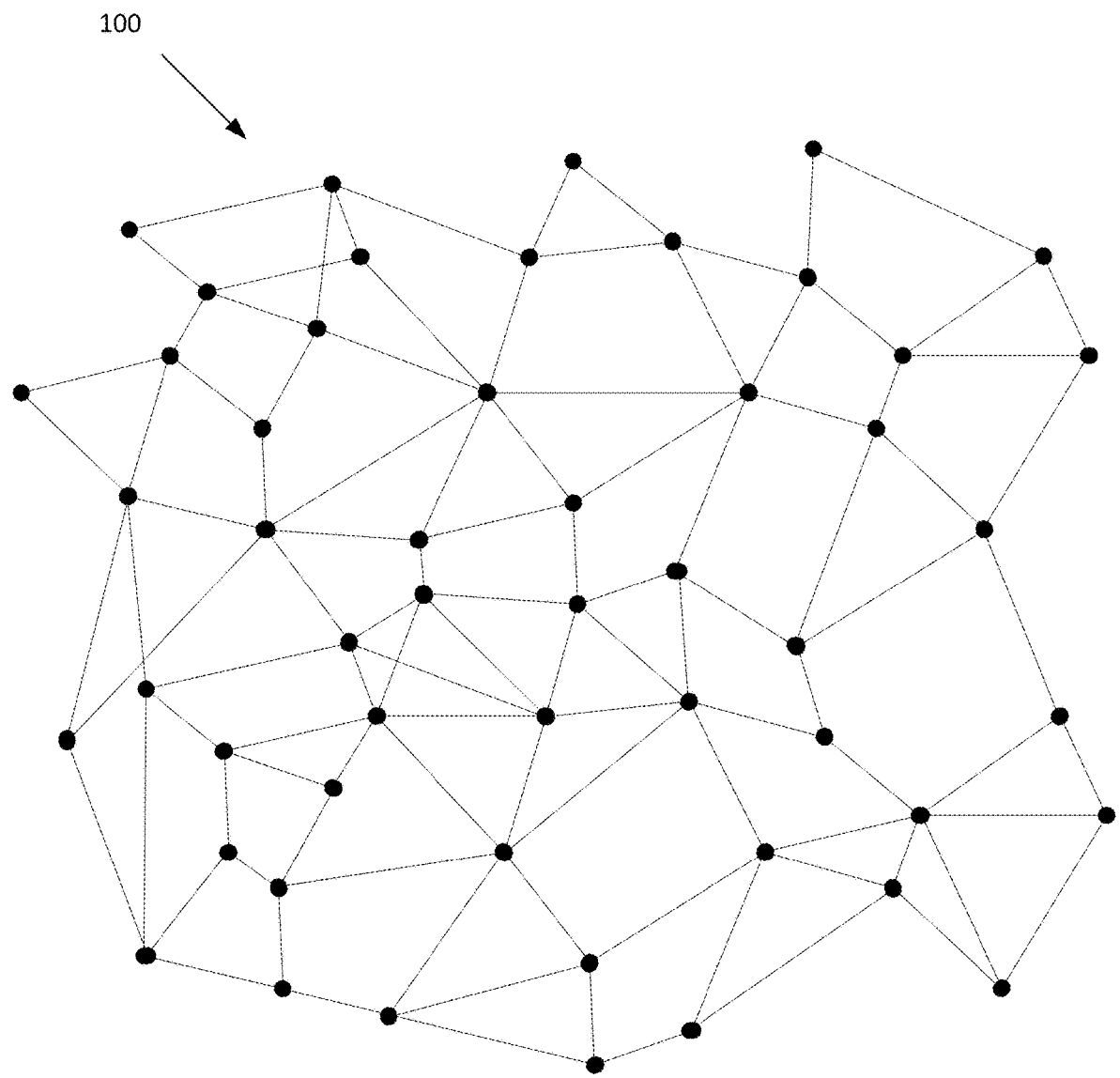
FIG. 1 is a diagram of related art illustrating a mesh network.
Figure 2:
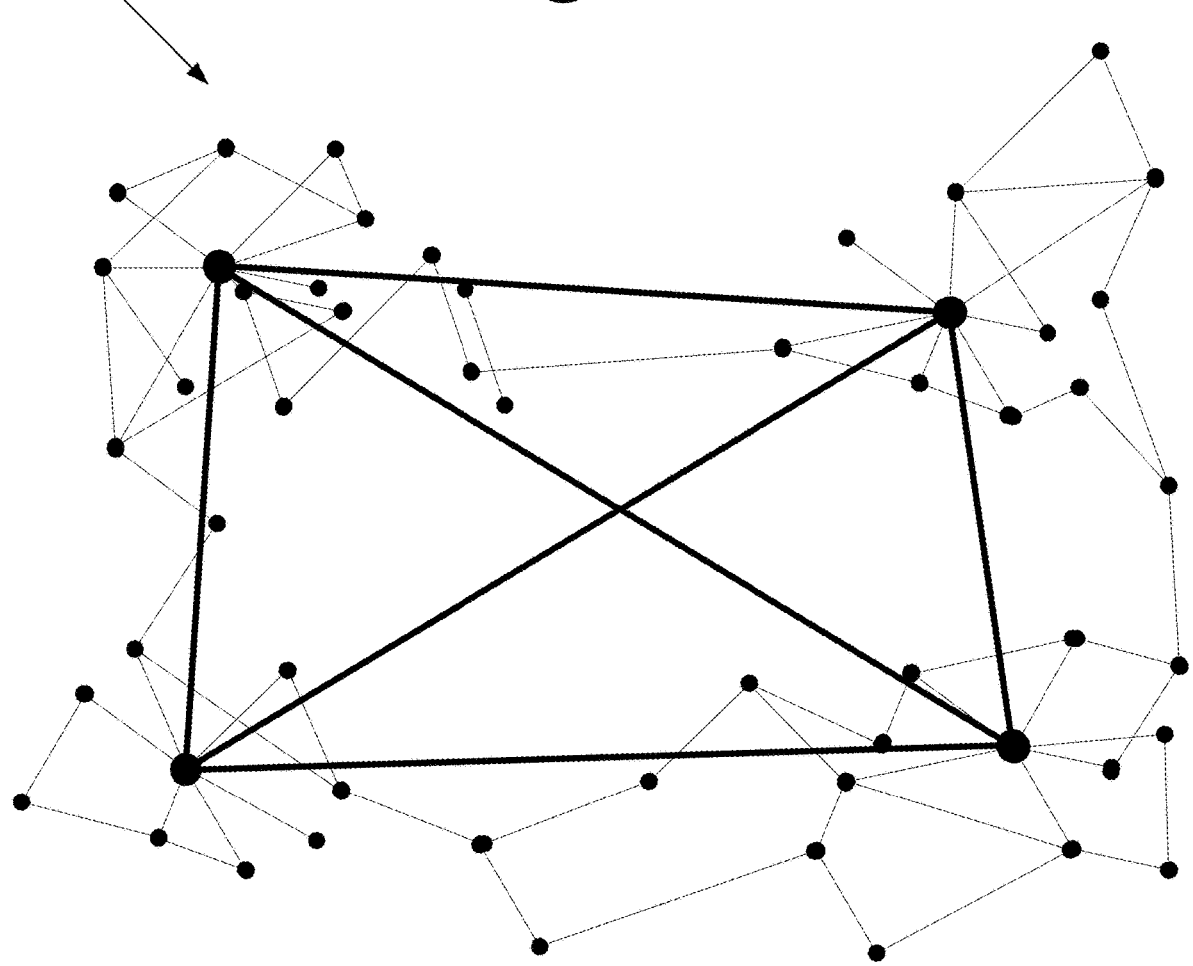
FIG. 2 is a diagram of related art illustrating a hub and spoke network with some meshing.
Figure 3:
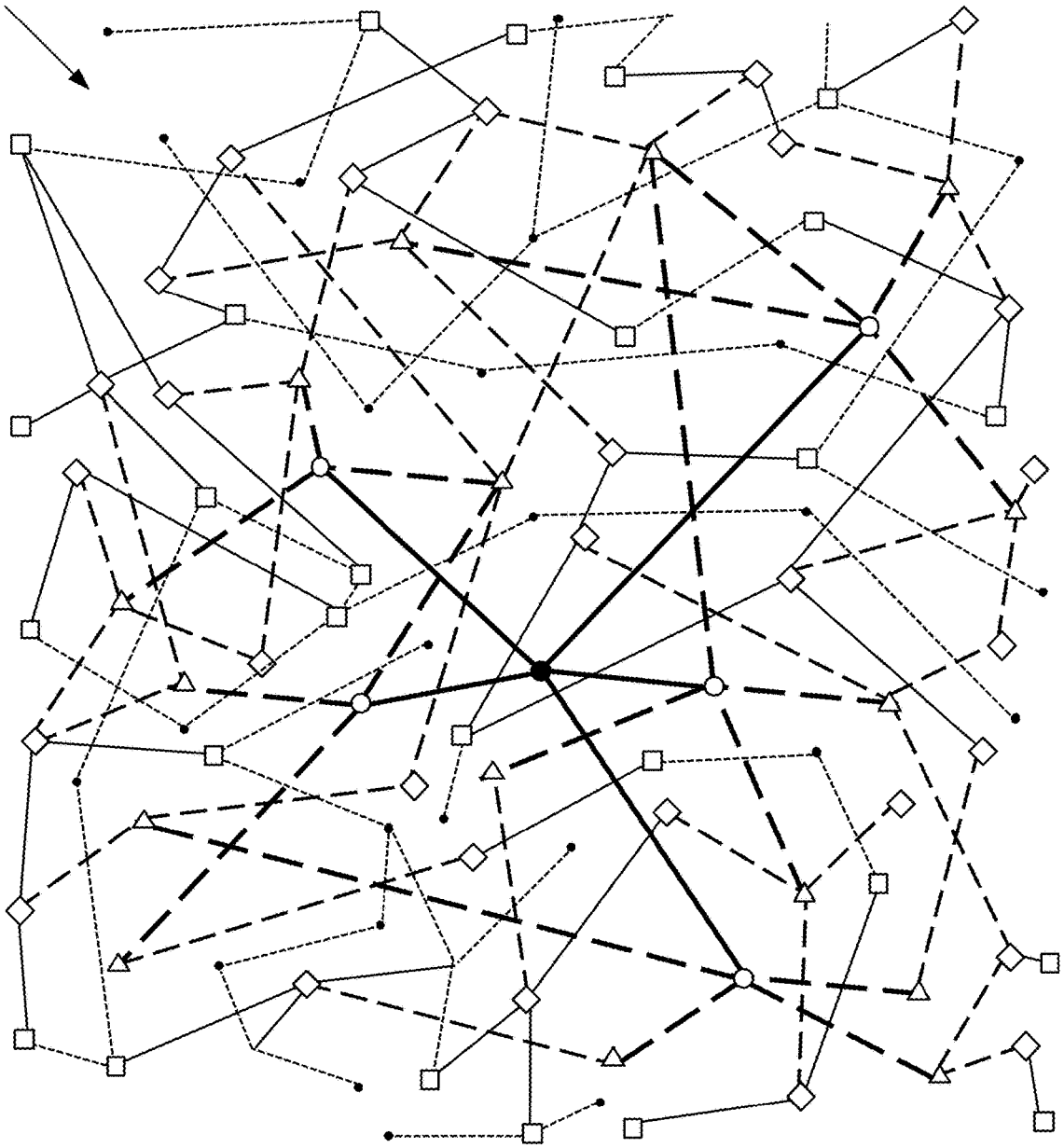
FIG. 3 is a diagram illustrating a portion of a network comprising of 4-hop local neighborhoods, according to an embodiment of the present invention.

FIG. 3 is a diagram illustrating a network 300 comprising of n-hop (with n=4) local neighborhoods, according to an embodiment of the present invention. In this embodiment, central (originating) node 302 can be characterized as the node around which one local neighborhood is defined. All nodes 304 reachable in one hop from node 302 are shown as open circles and these constitute the one-hop local neighborhood of the central node 302. Nodes 306 reachable in two hops are shown as triangles, nodes 308 reachable in three hops are shown as diamonds, and nodes 310 reachable in four hops are shown as squares. With respect to the central node 302, the two-hop local neighborhood includes all nodes 304 and 306; the three-hop local neighborhood includes all nodes 304, 306, and 308; and the four-hop local neighborhood includes nodes 304, 306, 308, and 310. It should be noted that nodes 312, which are not reachable in fewer than five hops, are shown as small black circles, and are non-local with respect to central node 302 when the network is defined with 4-hop local neighborhoods.

Rather than geographically defining the local neighborhood, in some embodiments, the local neighborhood is defined by the reachable nodes in n or fewer hops. It should be appreciated that hop lengths may have limits, in some embodiments.

Further, since local neighborhood is defined by the number of hops, the physical perimeter of the local neighborhood is weakly defined. For example, in some embodiments, although a node may be located physically close to central node 302, the node may not be within the local neighborhood of central node 302. In another example, although the distance between the node and central node 302 may be large, the node may be within the local neighborhood. In FIG. 3, for example, some non-local nodes are closer to central node 302 than the majority of the nodes in the local neighborhood, and closer even than some one-hop nodes 304.

Also, in some embodiments, although each local neighborhood is defined in terms of hop number from central node 302, every node in a network has its own local neighborhood and the external view of what a local neighborhood looks like depends on which node is chosen as the central node. At the same time, each local neighborhood is significant only to its own central node 302, e.g., each central node 302 may use its knowledge of its own local neighborhood in provisioning and routing.

For the purposes of executing provisioning and routing protocols, each node in a network maintains and continually updates its knowledge of its own local neighborhood in a local-knowledge table. The minimum information that central node 302 would need to have about the other nodes in its local neighborhood is limited to physical location and velocity (for example, in the form of orbital state vectors or ephemerides) of each node, number of hops necessary to reach each node, and the first hop in the chain that leads to each node. Additional information that may be useful, particularly in provisioning decisions, could include expected duration of existing links, the directionality of existing links (if any), anticipated new links, and the number of available unused ports at each node.

TABLE 1

Local Knowledge Table

| ID | Position | | | Velocity | | | Time | Distance | First Link | Optional Information |
|---|---|---|---|---|---|---|---|---|---|---|
| 00256 | x | y | z | $v_x$ | $v_y$ | $v_z$ | t | 1 | 00256 | ... |
| 00359 | x | y | z | $v_x$ | $v_y$ | $v_z$ | t | 3 | 00256 | ... |
| 00625 | x | y | z | $v_x$ | $v_y$ | $v_z$ | t | 2 | 01128 | ... |
| 00877 | x | y | z | $v_x$ | $v_y$ | $v_z$ | t | 4 | 00256 | ... |
| 00935 | x | y | z | $v_x$ | $v_y$ | $v_z$ | t | 3 | 00256 | ... |
| 01128 | x | y | z | $v_x$ | $v_y$ | $v_z$ | t | 1 | 01128 | ... |
| 01679 | x | y | z | $v_x$ | $v_y$ | $v_z$ | t | 3 | 01128 | ... |
| 02433 | x | y | z | $v_x$ | $v_y$ | $v_z$ | t | 4 | 00256 | ... |

Table 1 shows an example of a local knowledge table listing eight satellites in the local neighborhood where the satellites are indicated by serial number (first column). For each satellite, the listing includes a location and velocity in cartesian coordinates (columns 2-7) and a reference time for the location and velocity information (column 8). Those skilled in the art will appreciate that satellite location and velocity may alternatively be listed in other formats including, for example, spherical coordinates or quaternions, or in the form of two-line element sets such as those that are commonly used for indicating satellite positions in Earth orbit. The local-knowledge table in Table 1 further includes the distance to the satellite in terms of number of hops (column 9), and the first node in the chain that leads to the satellite (column 10). As noted, it may be beneficial to include additional information (column 11 or higher) beyond this basic set.

As noted, the size of the local neighborhood depends on the value of n, and nothing in the definition of the concept prevents n from being arbitrarily large. However, as n gets larger, the size of the local-knowledge table also becomes larger, and the information in the local-knowledge table about nodes that are many hops away becomes less reliable because of the time it takes for the information to propagate through the network. Thus, to maintain this local-neighborhood knowledge, each node in the network periodically transmits to its nearest (one-hop) neighbors a table of data. This table may include all current entries in its own local-knowledge table for nodes reachable in n−1 or fewer hops. On receiving a table from a neighbor, each node updates its own local-knowledge table. In general, network operations are based on a predefined value of n. To keep the local-knowledge tables to a manageable size, and to minimize the volume of transmitted data, the value of n is kept small, likely in the range of 4 to 8, but the optimum size will depend on other network characteristics.

For example, assume that nodes have on average m ports and that there is an average of m links per node (with a negligible number of unused ports). In this example, the number of entries in a transmitted local-knowledge table would be smaller than approximately $m^{(n-1)}$ even if there were no duplicate paths, i.e., multiple paths to the same destination. As m and n get larger (for a given total network size), there is more opportunity for duplication so the table would be smaller yet. Note that the size of the table is not directly a function of the overall network size (e.g., where again, the size is defined in terms of the total number of nodes in the network rather than the physical extent of the network). Instead, the local-knowledge table is a function of the size of, or number of nodes in, the local neighborhood.

It should be appreciated that there are some influences of total network size in that for a given m and n, larger networks may have less duplication within the local neighborhood, so the total number of nodes in the local neighborhood will grow, but not higher than the no-duplication limit. For a 5-hop local neighborhood where each node has five links (assuming that there are no duplicate paths), the number of nodes in the local neighborhood is 1705 while the transmitted local-knowledge table would have 425 entries. Depending on the precision of the physical location knowledge, each entry in the local-knowledge table will be no more than a few tens of bytes, so for the network with 5-link nodes using 5-hop local neighborhoods, and having, at most, 425 entries in each transmitted table, the total size of a transmitted table will be no larger than a few tens of kilobytes (kB). Assuming an update rate of once per second, in a network with an average communication speed even as low as 100 megabits per second (Mb/s), the overhead communications required to maintain local knowledge is a small fraction of one percent. The overhead may be further reduced by transmitting a local-knowledge table with detailed information only about nodes on links that have changed, with the remaining nodes indicated by a simple one- or two-bit code indicating no changes from the previous transmission. In the event of a lost link or a new link, the information may propagate through any relevant local neighborhoods one hop at a time; complete local knowledge is restored after n hops.

For comparison, this approach may be contrasted with protocols that require full network knowledge in routing data packets. For a network with N nodes and m links per node, the total number of links in the system is N*m/2. For a network of 10,000 nodes, assuming five links per node and five-hop local neighborhoods, the local knowledge table required for each node to route data packets may have at most 1705 entries, with each entry including a node identifier and a first hop on the path to the node. In contrast, a link table for the full network would involve 25,000 links, and a routing table may consider all links in determining an optimum route to a destination.

If we assume that the average lifetime of a link is 10 minutes (a number driven by orbital dynamics) and that the 1705 entries in the local-knowledge table represent 1705 distinct links, then on average about three links in the local neighborhood should change every second. Each change of the link may require an update to the local-knowledge table, but the update is simply a substitution of lists—there is no need to calculate new routes.

In contrast, the full-network link table, with 25,000 entries, will have links changing at a rate of about 40 per second. Since link tables assume complete network knowledge, every change is broadcast to all nodes in the network. This increases communications overhead burden by more than an order of magnitude larger than what would be required for maintenance of only local-neighborhood knowledge.

Furthermore, since changes in links can affect any part of the network, the continual recalculation of the routing tables, which is necessitated by frequent link changes, may become a severe computational overhead for the individual network nodes. Finally, since it may take some time for changes in a link status to propagate through the full network, a routing protocol that defines a path up front frequently encounters situations where a packet is launched toward a destination only to find a broken link along the way. This would necessitate robust error-handling protocols. In contrast, by routing based on local-neighborhood knowledge, the latest information within the local neighborhood is used, particularly with respect to the next hop. Further, the protocol is intrinsically robust to changes occurring in the network, even within the local neighborhood, since the local neighborhood is redefined with each hop.

In principle, since orbital dynamics allow forecasting of the location of all nodes with some degree of precision for days to weeks ahead, it may be possible to plan the provisioning timetable and calculate routing tables in advance. This way, the provisioning timetable and routing tables are distributed to all nodes. However, this approach is not resilient to effects such as technical failures or intentional jamming that might take one or more nodes out of service.

Furthermore, with optical links, there may be some overhead time (ranging from a few seconds up to minutes) required to establish a link. Since this overhead time is not necessarily predictable, preplanned link tables must take this into account by allowing adequate margin for the worst cases, which would lead to underutilization of links that are established with minimal overhead time.

The motivation for using local knowledge is to reduce the need for exchange of information about network topology. Specifically, the motivation is to reduce the overhead communications burden and to ensure that provisioning and routing decisions are based on up-to-date information. Thus, each node is restricted to propagating to its nearest neighbors something less than the total of information that it knows about its own local neighborhood.

One or more embodiments described above may limit the transmitted information by defining a local neighborhood based on a fixed number n of hops and may limit transmission to include only information for nodes that are fewer than n hops away. In some embodiments, however, the overall network performance may be improved at the possible cost of some additional computational burden by relaxing the rigidity of the local-neighborhood size and giving each node autonomy in evaluating the utility of paths to nodes in its local neighborhood. This may occur prior to deciding which paths to include in its transmitted local-knowledge table.

In an embodiment, the local neighborhood size is defined in term of n* hops, where n* is a "recommended" or average depth of knowledge (in terms of number of hops). Thus, the transmitted local-knowledge table may include "useful" nodes that are substantially more than n* hops away. It should be appreciated, however, that there may be nodes in the local neighborhood that are fewer than n* hops away, but these nodes may not be considered useful, and thus, not included in the transmitted table. If the local neighborhood is described in terms of n* hops, then each node is responsible for estimating the utility of paths to each of the nodes in its local neighborhood and only the more useful nodes are listed as entries in its transmitted local-knowledge table. The estimation of utility may include a range of factors, which are discussed below in the section on provisioning.

An alternative to defining n* is simply to limit the size of transmitted local-knowledge tables to some number j of entries to limit the volume of overhead communications. This approach, in principle, allows almost unlimited depth of knowledge along the selected paths while limiting knowledge depth along most other pathways. While this may be useful in some network topologies, it may also introduce an unacceptable additional delay in propagating knowledge updates throughout any given local neighborhood.

An enhancement to the embodiment of the n*-hop local neighborhood allows nodes to transmit different local-knowledge tables to different nearest neighbors. This enhancement takes into account the direction to the neighbors, or the traffic demand from those neighbors, in deciding which nodes in its own local neighborhood might be useful to its neighbors. In addition, it is not necessary that all nodes use the same value of n* (or j); some nodes may use larger local-knowledge tables than others.

Provisioning

While there are special cases, such as first launch of a new network or merging of two pre-existing networks, provisioning is generally a steady-state process. For example, each node in the network has a number of existing links and knowledge of its n-hop local neighborhood. For each node, links may be lost, either through orbital motion making the link untenable, through proactive decision processes determining that a link is of limited utility, or other planned or unplanned events that disable a link. When a link is lost (or in anticipation of a link expected to be lost), the node examines its local neighborhood and determines which nodes within the local neighborhood (with which it is not already directly linked) would make suitable candidates for a replacement link. By way of example, the metrics used are discussed below.

Figure 4:
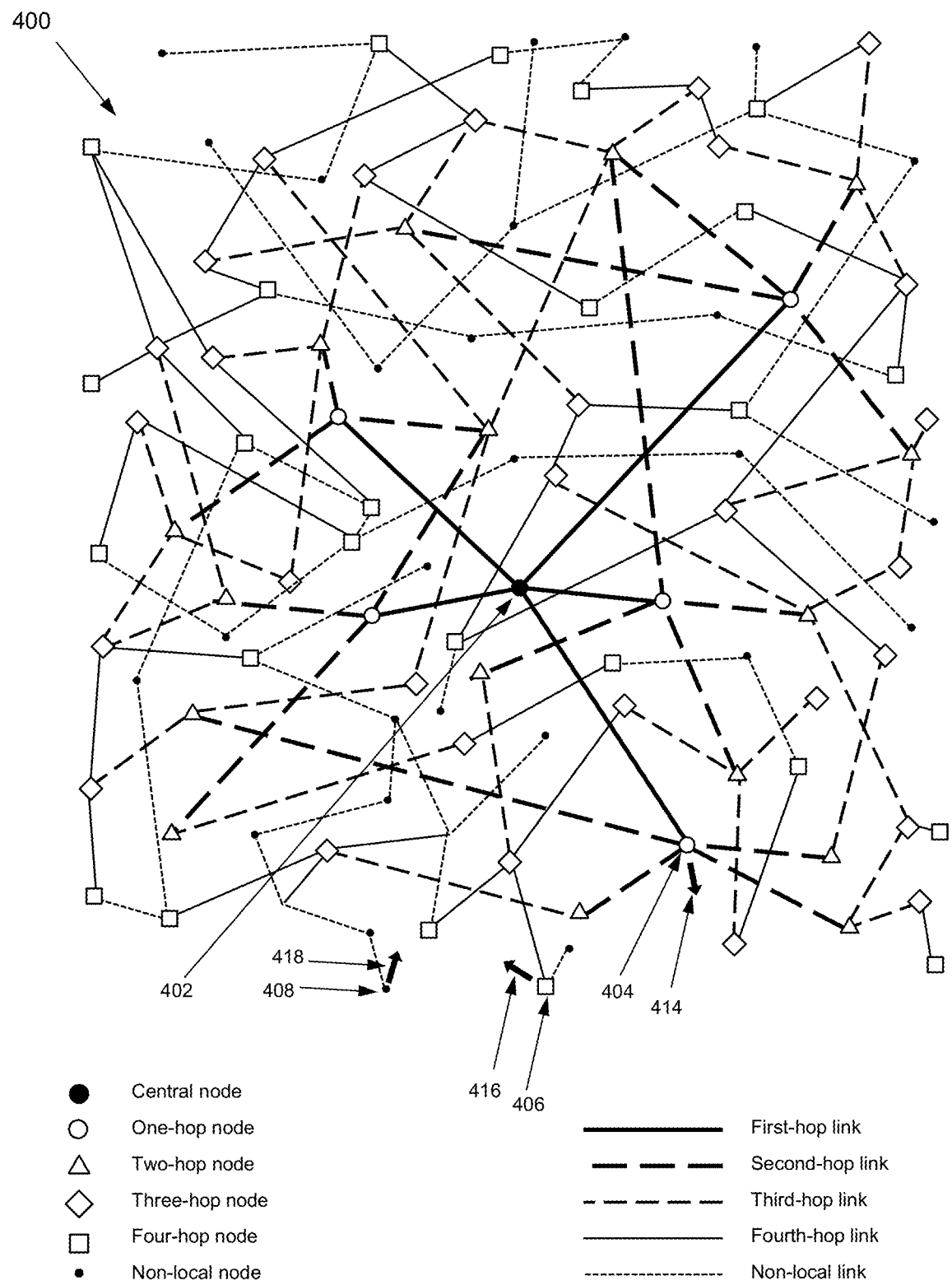
FIG. 4 is a diagram illustrating a portion of a network including the local neighborhood around a central node, according to an embodiment of the present invention.

For the purposes of discussion, consider the local neighborhood around a central node 402. See, for example, FIG. 4, which is a diagram illustrating a portion of a network 400 including the local neighborhood around central node 402, according to an embodiment of the present invention. In this embodiment, assume that one-hop node 404 is moving away from central node 402 with a velocity relative to node 402 indicated by arrow 414, and is about to pass out of range with central node 402. In this case, the link between node 404 and node 402 is about to be, if not already, lost.

When the link is about to be, or is lost, central node 402 examines the local neighborhood and identifies another node as a suitable replacement for node 404. In this example, node 406 is four hops away from node 402, at the perimeter of its local neighborhood, and with a velocity 416 relative to node 402 that will keep it within range of node 402 for some time. Node 402 may send a message (along existing links) to node 406 proposing a new link starting at a specific time. This message may also include high-precision ephemeris information for node 402 (to support closing an optical link). Node 406 may accept or reject the proposal based on its own evaluation of the potential utility of the link. If node 406 accepts the proposal, node 406 sends a message back to node 402 (along existing links) that includes its own high-precision ephemeris information. Node 402 completes the handshake by confirming and sending its own ephemeris information if it has not already done so. The two nodes may then initiate the new link at the scheduled time and exchange their respective local-neighborhood knowledge tables.

In an alternative embodiment, nodes may propose and establish new links with other nodes in the network that are not part of the local neighborhood. To support this process, each node maintains a table of ephemeris information about some or all of the other nodes in the network, including those not in the local neighborhood. In contrast with link-state information, which changes on a time scale of seconds to minutes, ephemeris information changes only on time scales of days to weeks, particularly if only approximate information is required. As such, daily updating of ephemeris information, which can be accomplished, for example, through uplink from ground systems that monitor satellite orbits, is more than sufficient for any node to be aware of other non-local nodes that may be nearby. Continuing with the example shown in FIG. 4, central node 402 may be aware of non-local node 408, and further may be aware that node 408 is on a trajectory 418 that may, for example, keep it in range of node 402 for a longer time than node 406, which may be on trajectory 416 not as favorable for a long-duration link. Thus, central node 402 may propose a link with non-local node 408 by sending a message through the network in the same manner as any other data packet (see the routing section below). After, or as part of, the initial exchange of messages, nodes 402 and 408 may exchange high-precision ephemeris information to support establishing a new optical link. Since the transit time of messages through the network will be short compared to the time scale for position changes due to orbital motion, such non-local message exchanges can support establishment of new optical links with nodes not currently in the n-hop (or n*-hop) local neighborhood.

Provisioning Metrics

With each of the nodes making autonomous decisions about provisioning, the overall network topology is determined by the selection of a provisioning algorithm and associated metrics. A number of factors are considered as metrics for ranking the value of existing and potential links. In one example, the provisioning algorithm may select new links based on distance only, with the goal of maintaining a specified mix of short, medium, and long links. Since the nodes are all moving relative to one another, however, any mix of distances may evolve with time even without making or breaking any links. As such, the relative velocity between two nodes may be used to predict the future range between the nodes and the possible duration of a link.

In certain embodiments, the total network may be more robust and versatile when each node has links in a variety of directions. For example, when a given node has all (or most) of its existing links in a generally easterly direction, a new link is likely to be more valuable when the new link is in another (say westerly) direction. This value is likely to derive from the ability of the new westerly link to reach more unique destinations than would be reachable with a new link in an easterly direction, where any new local-neighborhood nodes would be more likely to overlap with existing local-neighborhood nodes. With this in mind, it may also be useful to treat uniqueness of the link as a metric. This may be accomplished by having nodes exchange lists of local-neighborhood nodes before committing to a new link. Alternatively, uniqueness comes about naturally if new links are established primarily with nodes not already in the local neighborhood. Another factor useful in evaluating existing links is the volume of data traffic that has used that link during some recent time interval.

In some other embodiments, the existence of an invitation from another node may also be considered as a metric when evaluating the utility of a potential link. Although the list of metrics may be extensive, only some of the metrics are discussed herein.

Some combination of a set of metrics are incorporated into the provisioning algorithm, with the relative weights of the various metrics being used to tune the structure and performance of the overall network. Appropriate weighting factors are learned from some combination of modeling and operational experience, either through machine learning or human intervention.

Reactive and Proactive Provisioning

As the nodes are all moving relative to one another, existing links will be subject to loss due to increasing range, crossing the limb of the Earth, changes in sight angle, excessive slew rates, or other factors. Nodes in the network may operate in an entirely reactive manner by waiting until a link is lost before seeking a new link. Since most link losses are driven by orbital dynamics, however, the loss of the links is relatively easy to predict. With this in mind, nodes may proactively start seeking new links before existing links are lost. This will have a double benefit. For example, greater utilization of link capacity due to decreased down time will be realized. Further, the node may have a larger local neighborhood in which to seek a new link before any links are lost.

Figure 5:
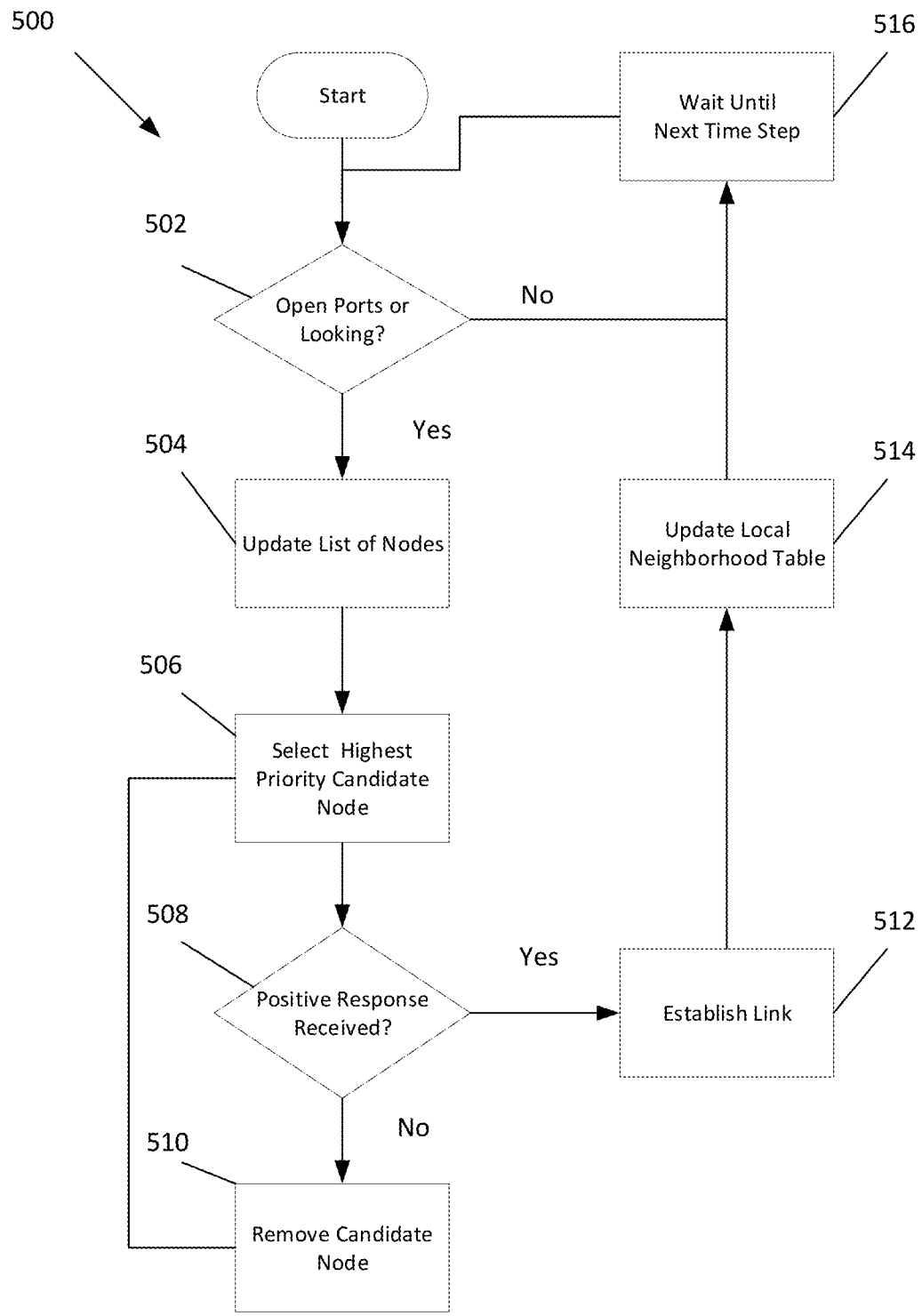
FIG. 5 is a flow diagram illustrating a process for reactive provisioning, according to an embodiment of the present invention.

FIG. 5 is a flow diagram illustrating a process 500 for reactive provisioning, according to an embodiment of the present invention. In this embodiment, process 500 may begin at 502 with the node checking for, or looking for, open ports. If any port is open, then at 504, the list of nodes that are in range are updated and prioritized. Otherwise, if no ports are open, then the process waits for the next time step at 516.

At 506, for each port that is open, the highest priority candidate node is selected, and a link request is sent from the node to the highest priority candidate node. At 508, the node determines if a positive response is received from the highest priority candidate node. If a positive response is not received, or after a predetermined time period has elapsed, the highest priority candidate node is removed at 510, and the process returns to 506. Otherwise, at 512, the node establishes a link with the highest priority candidate node, when a positive response is received from the highest priority candidate node. At 514, the node updates the local neighborhood table, and at 516, waits until the next time step.

An additional enhancement is proactive provisioning, wherein nodes would continually assess the value of existing links and proactively terminate non-productive links even when not forced to do so immediately by orbital dynamics. Thus, for example, when two links are found to essentially duplicate one another, one of the links may be abandoned in favor of a new, more valuable link.

To support proactive provisioning, the local-knowledge table may include additional information. This information includes a listing of current or expected unused (or underused) link capacity or a time when an existing link is expected to become unavailable. Other information such as link types is included. For instance, link types include RF vs. optical, long vs. short range, preferred directions, etc. Furthermore, even though the transmitted local-knowledge table is restricted to detailed information about nodes out to the range of n−1 hops, it may be useful to include, for each node, information about the extremes of range (latitude, longitude, altitude, or some other coordinate system) reachable within their respective local neighborhoods.

Figure 6:
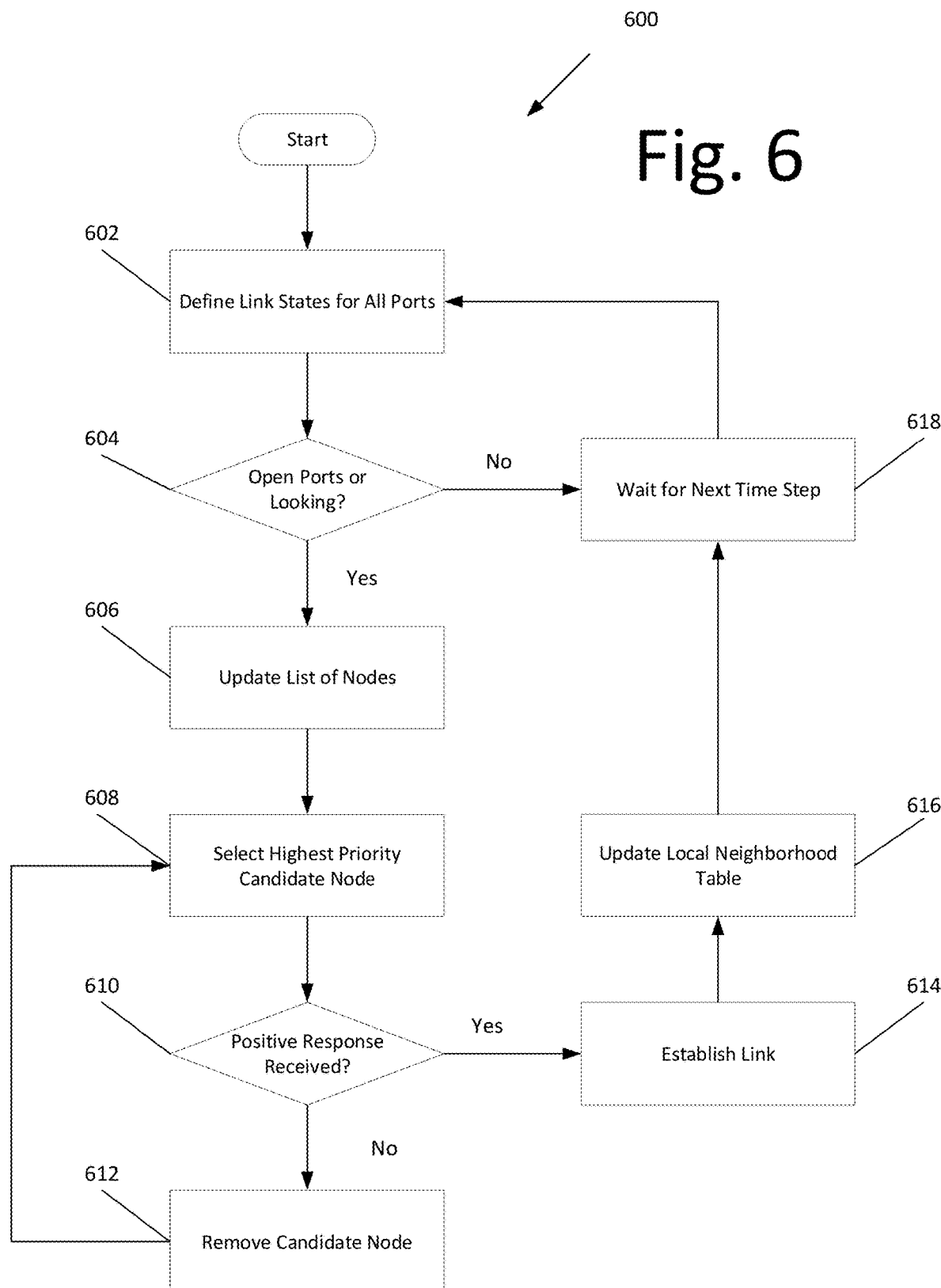
FIG. 6 is a flow diagram illustrating a process for proactive provisioning, according to an embodiment of the present invention.

FIG. 6 is a flow diagram illustrating a process 600 for proactive provisioning, according to an embodiment of the present invention. In this embodiment, process 600 may begin at 602 with the node defining link states for all ports. This may include open ports, looking ports, available ports, and closed ports. In some embodiments, an open port is one with no current connection, a looking port has an existing link of limited value either because it is expected to pass out of range soon, or because it is duplicative of other existing links, an available port has an existing link of some value, but one that the node may be willing to drop if it receives a link request from a node that would provide a more-valuable link, and a closed port has a link that is of high value to the node and is not available for reassignment. At 604, the node checks for any open ports or looking ports, and if nothing is found, the node continues to 618 and waits until the next time step. Otherwise, the node at 606 updates the list of nodes that are in range and prioritizes those nodes. At 608, for each port that is defined as being open or looking, the highest priority candidate node is selected, and a link request is sent to the highest priority candidate node. At 610, the node determines if a positive response is received from the highest priority candidate node within a predefined period of time. If no response is received, i.e., there is a timeout, or a negative response is received, from the highest priority candidate node, then at 612, the node removes the highest priority candidate node from the list and returns to step 608 to select the next highest priority candidate node. Otherwise, the node at 614 establishes a link with the highest priority candidate node, and at 616, updates the local neighborhood table. At 618, the nodes wait until the next time steps before returning to step 602.

The above discussion of provisioning applies to the general case of a continually-evolving network topology of typical relay nodes (those having multiple input and output ports). However, there are also several special cases that need to be considered.

Recovery of Lost Nodes

In the protocols described above, continual provisioning depends on the nodes exchanging information over existing links. If a node, for whatever reason, loses all existing links, then non-standard procedures are used to reestablish a connection to the network. Without an existing connection, the node does not have precise ephemeris information for any other nodes, and even if the node did have that ephemeris information, other nodes would not expect an optical link and would not be pointing a receiver in the proper direction to receive the link. Thus, all nodes should have at least one broad-beam or omnidirectional communications channel, such as a RF channel.

In one example, when a node loses all links with the network, the node may broadcast over RF seeking an initial link with at least one nearby node. This at least one nearby node may be close enough to receive the RF link. The node with no optical link may then exchange information over the RF link sufficient to establish at least one new optical link. From that new optical link, the node can then reestablish complete connection with the network.

In another example, a node that has lost all links may negotiate at least one new link through a third-party, such as a ground- or space-based central authority. This third-party may maintain up-to-date information about the physical location of nodes in the network and may relay link invitations.

Insertion of New Nodes

Similar to the embodiment of a lost node, when new nodes are launched, the new nodes need to negotiate a first link using similar processes as discussed above for nodes having lost all optical links.

Connection to Ground Nodes

Unlike space-based nodes, ground-based nodes are subject to unpredictable dropouts due to weather. Possible approaches to reconnect the space-based node to the ground-based nodes after the weather clears include:

- a set of space-based nodes (and the set may include all space-based nodes) configured to attempt, on a periodic basis, to connect with the ground-based nodes whenever the ground-based nodes are in range regardless of the weather;
- having a RF command link to negotiate links with space-based nodes within range; or
- using alternate paths (through other ground-based nodes not obscured by clouds) to send link requests to space-based nodes known (from ephemeris data) to be within range.

To support these options, the ground-based nodes, which are small in number when compared to space-based nodes, are configured to maintain and continually update a database of all space-based nodes (or at least those capable of linking to the ground) including at least up-to-date ephemeris information.

Source-Only Nodes (Data Generators that do not Act as Relay Nodes)

Many Earth-observation satellites generate large amounts of data that is sent to the ground. At the same time, these satellites may not be configured to provide relay services. For example, these satellites may have optical transmitters but not optical receivers. Since the satellites are limited to one (possibly outgoing only) link at a time, the satellites may not be in a position of having the means to negotiate new links over optical channels. Like lost nodes or new nodes, these satellites may have to depend on RF communication links to negotiate optical links for data downloads. Such negotiations may take place directly with nearby nodes, or through a third party such as a ground-control center.

Simple Bent-Pipe Relays for Long Haul

The simplest relay node may include one input channel and one output channel. While many, if not most, relay nodes may have multiple channels, there is some potential value to include simple bent-pipe relays to connect distant multi-channel relay nodes, or to connect multi-channel relay nodes with ground stations that are over the horizon and out of range. These bent-pipe relays are out of contact with the network during switchover from one link to another. For example, let satellite A have a high volume of data destined for a ground station that is moving beyond the horizon due to orbital motion of satellite A. Further, let satellite A have a simple bent-pipe relay node following in the same orbit such that the bent pipe will be within range of the ground station for several more minutes. Satellite A can send a message to the bent-pipe relay through a low-rate RF channel indicating the need for relay services and the bent-pipe can respond over the RF channel to establish a high-rate optical relay to the ground station.

Routing

During operation, each node is autonomous in that it makes its own routing decisions. For example, when a node receives a data packet, the node may inspect the data packet. The data packet may include an address, which includes a node identifier for the destination and preferably a physical location of the destination. The node may compare the address against its local-knowledge table. If there is an entry for the destination node in the local-knowledge table, the node routes the packet to the first hop in the chain to the destination. If there is no entry for the destination, the data packet is routed based on geography. In some embodiments, the data packet is routed toward the node in its local neighborhood that is physically closest to the physical location of the destination. An example of this process is illustrated in two dimensions with reference to FIG. 7 and the flow diagram of FIG. 8.

Figure 7:
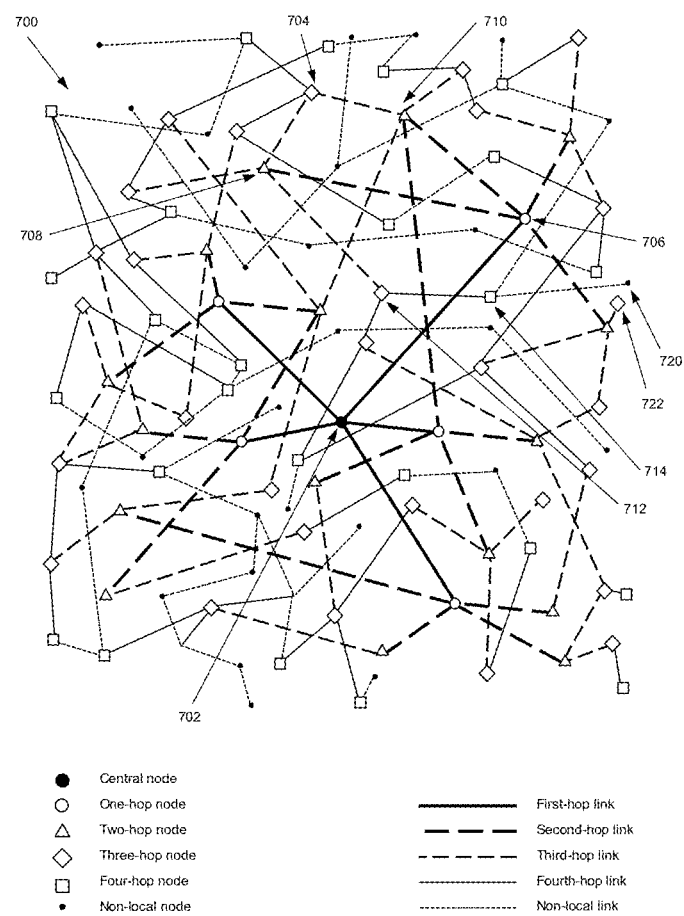
FIG. 7 is a diagram illustrating a portion of a network including the local neighborhood around central node, according to an embodiment of the present invention.
Figure 8:
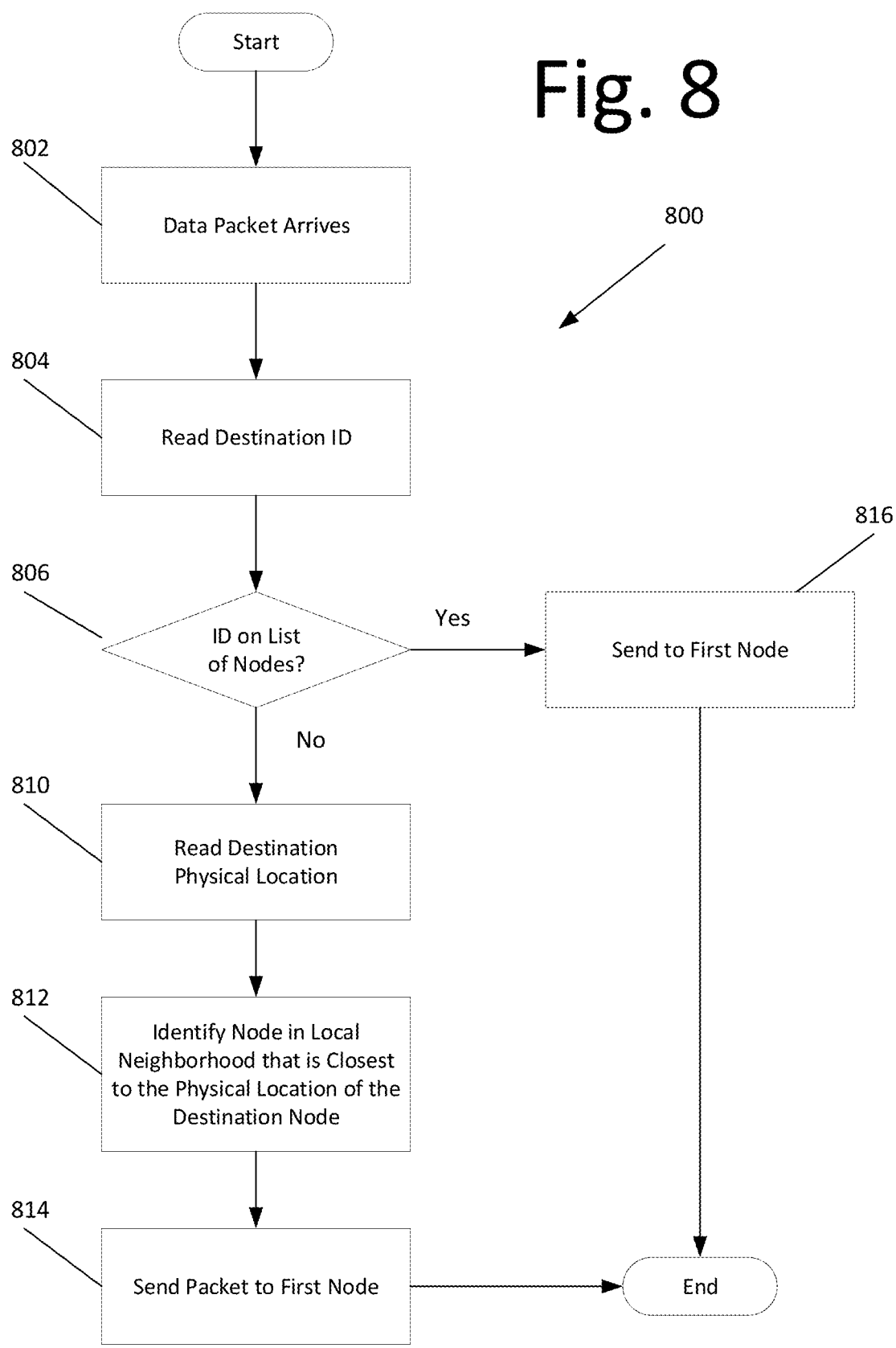
FIG. 8 is a flow diagram illustrating a process for distance-based routing, according to an embodiment of the present invention.

FIG. 7 is a diagram illustrating a portion of a network 700 including the local neighborhood around central node 702, according to an embodiment of the present invention. FIG. 8 is a flow diagram illustrating a process 800 for distance-based routing, according to an embodiment of the present invention. In some embodiments, process 800 may begin at 802 with the data packet arriving at central node 702. At 804, central node 702 reads the destination identification from the data packet. The destination information may include node identification. At 806, central node 702 determines, using the destination information, if the node is on the list of nodes in the local knowledge table. If the node is on the list, then at 808, central node 702 transmits the data packet to the first node on the path to the destination. For example, assume the address of the packet is node 704, then node 704 will be found by node 702 on its local-knowledge table, with the first link on the path to node 704 being by way of node 706, so node 702 will send the packet to node 706. On arrival at node 706, the packet may be routed to node 708, which is one hop away from node 704. Finally, node 708 will send the packet to node 704. Note that node 706 could equally have sent the packet to node 710, which is also one hop away from node 704.

If, however, the node is not on the list of nodes (e.g., destination is determined to be outside the local neighborhood), then at 810, the physical location of the destination is read and compared with the locations of the nodes in the local neighborhood. By way of example, assume a data packet arriving at node 702 is addressed to node 720, which is not in the local neighborhood of node 702. At 812, central node 702 identifies node 722 as the node in the local neighborhood physically closest to destination node 720. At 814, central node 702 then routes the data packet to node 706, which is the first node on the path to node 722. When the data packet arrives at node 706, node 706 compares the destination address with its own local-knowledge table and finds that node 720 is in its local neighborhood, four hops away by way of nodes 708, 712, and 714. Thus, node 706 will route the packet to node 708, and the packet will eventually reach its destination by way of nodes 712 and 714. Note that node 722, although physically closest to node 720, is not on the path to node 720 in the local-knowledge table of node 706. Thus, although node 702 may have sent the packet to node 706 because it was on the path to 722, the nodes operate independently of one another and node 706 was free to reroute the packet based on information in its own local-knowledge table that was not available to node 702.

It should be appreciated that in other examples, the destination may not be in the local neighborhood of the second node, and the second node may repeat the process, using its own local neighborhood to identify a node physically closest to the destination. After repeating the process at each successive node, the data packet eventually reaches a node in the local neighborhood of the destination node, at which point the final path is determined.

To implement this routing algorithm, the originator of a data packet should know the physical location of the destination (e.g., in the form of orbital ephemeris information). It is not necessary, however, for any of the intermediate nodes (outside the local neighborhood of the destination) to have any prior knowledge of the location (or even of the existence) of the destination node.

Analogous to a central registry of IP addresses, it may be useful to have a central registry of orbital ephemeris information. This may allow each node to periodically connect with the central registry and receive updated orbital elements. This way, if a message needs to be sent to a spacecraft, and if the sender does not know the current whereabouts of that spacecraft, the sender can first query the registry to obtain a recent set of orbital elements. In some embodiments, a non-public portion of the registry may be implemented for those spacecraft whose locations are confidential.

There are various possible approaches to identify the local-neighborhood node that is closest to a packet's destination. In an embodiment, the physical distance is calculated between the destination location and the locations of each of the local-neighborhood nodes. However, with large local neighborhoods, the computational overhead may become prohibitive when the calculation is performed for every data packet. For example, to calculate the physical distance between one node and another, the ephemeris information for each node is evaluated. This may determine a current physical location in three-dimensional space, which may be expressed, for example, in terms of a cartesian coordinate system centered on the Earth. In this example, the physical distance is obtained by taking the square root of the sum of the squares of the differences on each of the three cartesian axes. The process may be expedited somewhat by having each node maintain an up-to-date table of the current physical location of all nodes in its local neighborhood, as entries in the local-knowledge table, in some embodiments.

To support geographic routing, this information may be updated at least every few seconds since orbital speeds in LEO are typically above 7 km per second. Even with such precomputation of physical locations, for a system using strictly distance-based geographic routing, it may be necessary to perform three subtractions, three multiplications, an addition, and a square root computation for each node in the local neighborhood every time a data packet is routed to a destination outside the local neighborhood. For a node processing, possibly, several million data packets per second, the computational overhead would be challenging.

Figure 9:
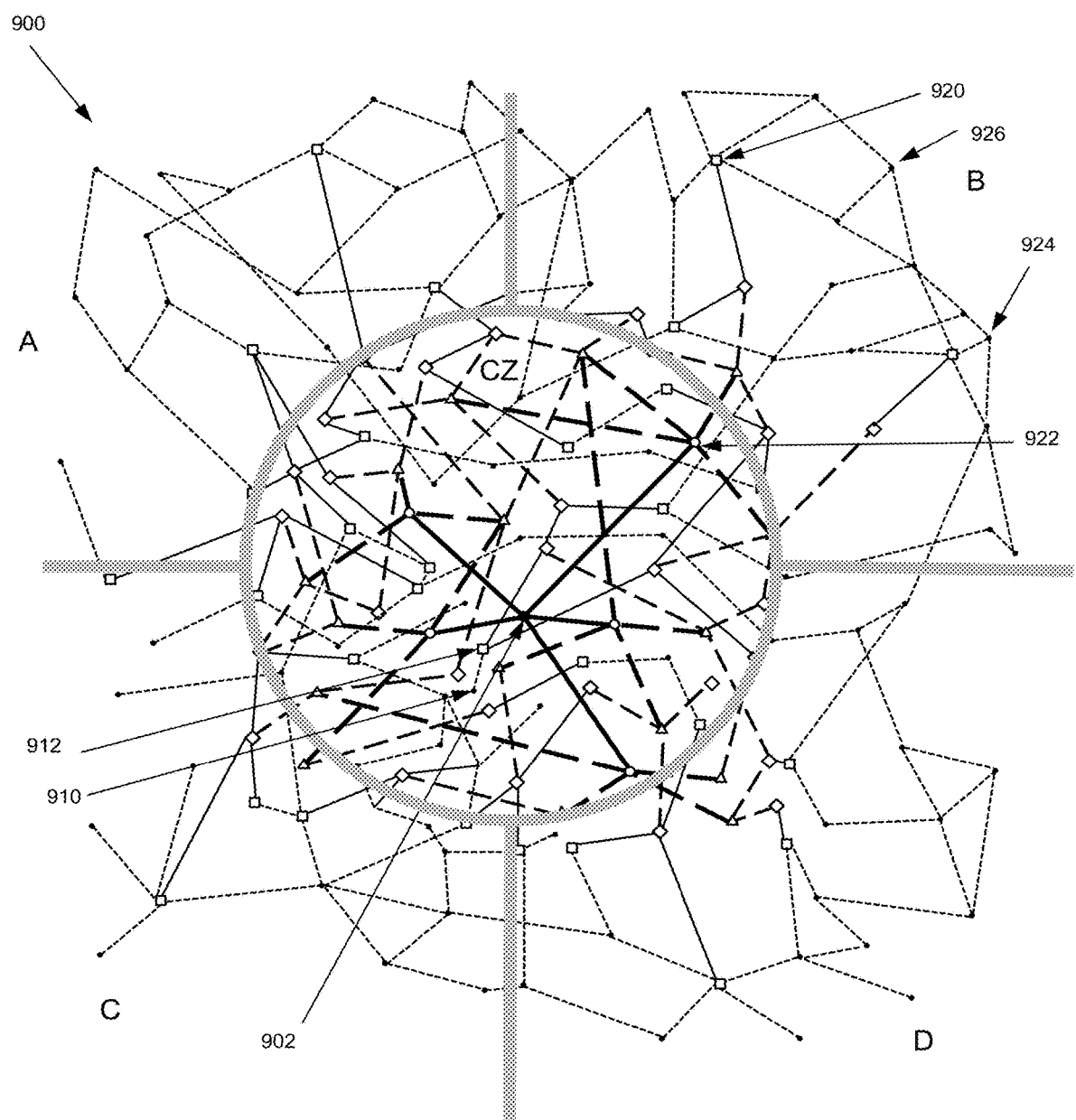
FIG. 9 is a diagram illustrating a local-neighborhood network comprising of sections for routing outside of the local neighborhood, according to an embodiment of the present invention.

In another embodiment, each node defines a set of sectors or zones encompassing all of space. FIG. 9 is a diagram illustrating a local-neighborhood network 900 comprising of sections for routing outside of the local neighborhood, according to an embodiment of the present invention. For example, the diagram shows, in two dimensions (2D), a set of sectors that divide space relative to the local neighborhood around central node 902. The sectors include four sectors A, B, C, and D for non-local nodes that are physically distant from central node 902, as well as a central zone CZ for nodes not in the local neighborhood, but physically nearby, e.g., node 910. For each sector, central node 902 may define one or more nodes to be the preferred first destination for data packets addressed to non-local nodes in that sector. For example, node 920, which is a four-hop local neighbor of central node 902, is physically located some distance into sector B. In this example, node 920 is presumed to have more local neighbors in that sector than nodes not in sector B. Since node 922 is the first hop on the path from node 902 to node 920, node 902 may define node 922 as the preferred destination for data packets addressed to non-local nodes in sector B. Continuing with this example, if a data packet addressed to node 924 arrives at node 902, node 924 will be recognized as not being in the local neighborhood of node 902, but will be recognized as being in sector B. In this example, node 902 sends the packet to node 922, the preferred destination for data packets addressed to non-local nodes in sector B.

When the packet arrives at node 922, process 900 is repeated. In this case, however, node 924 is recognized to be in the local neighborhood of node 922 and the data packet will be routed directly to node 924 without going through node 920. On the other hand, if the data packet were addressed to node 926, central node 902 may still send the data packet to node 922. In this case, though, the destination 926 is also not in the local neighborhood of node 922, so node 922 may implement its own sector routing process to move the data packet closer to node 926, possibly still through node 920.

For non-local nodes in the central zone CZ, the preferred first hop may be simply the shortest first hop available to central node 902, or the first hop on the path to the fourth-hop node in the local neighborhood that is physically closest to central node 902. In the diagram of FIG. 9, fourth-hop node 912 is physically closest to central node 902 and may be assumed to have a local neighborhood that overlaps the physical space of the local neighborhood of node 902, but with limited duplication of member nodes, and would thus make a useful target for packet addressed to non-local nodes within the central zone.

Figure 10:
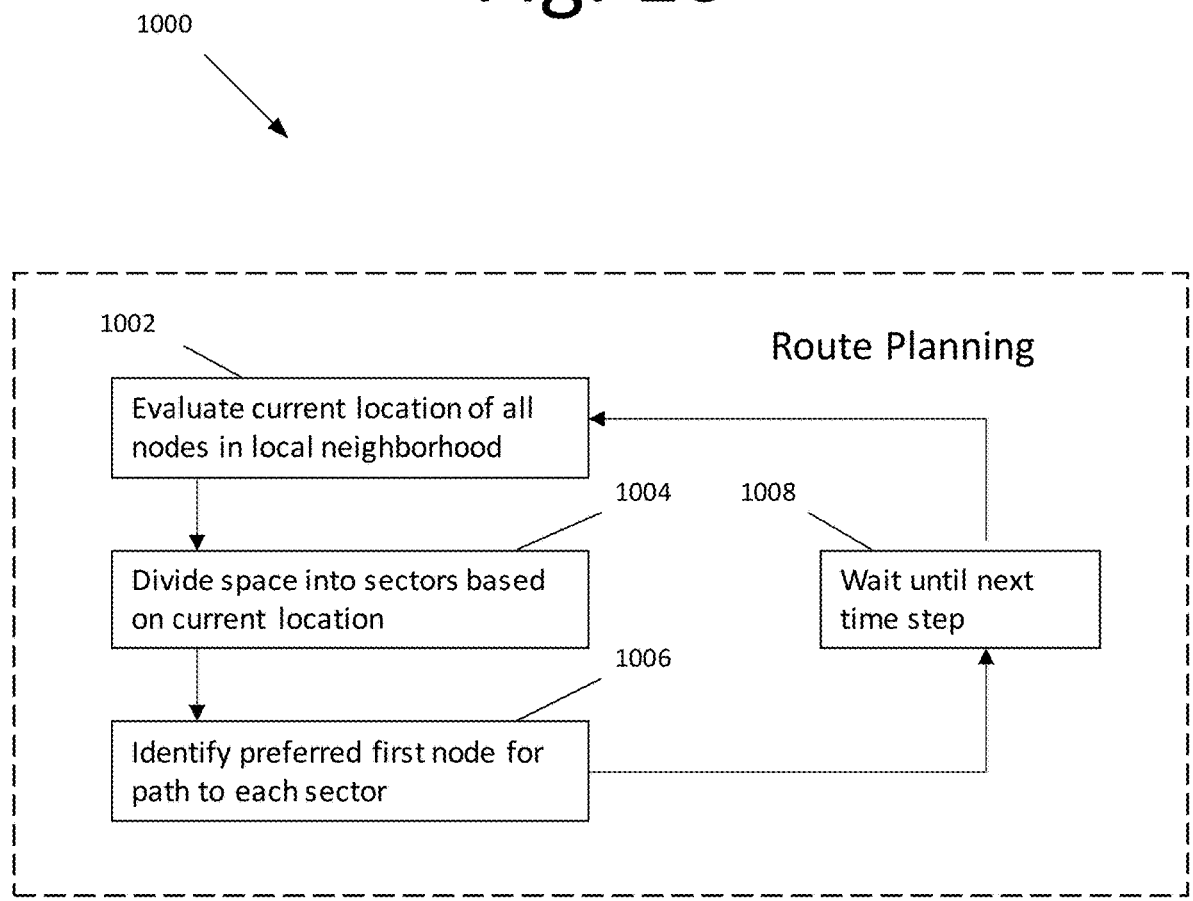
FIG. 10 is a flow diagram illustrating a process for routing using sectors, according to an embodiment of the present invention.

In some embodiments, each node periodically identifies a set of sectors relative to its current location and a preferred node for destinations in each sector that are outside of the local neighborhood. When a destination for a data packet is outside of the local neighborhood, the routing algorithm may evaluate the physical location of the destination, identify the corresponding sector, and route the packet toward the node preferred for that sector. FIG. 10 is a flow diagram illustrating a process 1000 for routing using sectors, according to an embodiment of the present invention. In some embodiments, process 1000 begins at 1002 with the node evaluating the current location of all nodes in the local neighborhood, and at 1004, dividing the space into sectors based on the current location of the nodes in the local neighborhood. At 1006, the node identifies one or more preferred first nodes for each sector. At 1008, the node waits until the next time step before returning to step 1002. The selection of the preferred node or nodes for each sector may be based on combinations of various selection criteria. This may include, for example, the first-hop node closest to a given sector, the first-hop node on the path to the node in the local neighborhood closest to, or most deeply embedded within a given sector, the first hop node with the most available bandwidth on a path toward a given sector. Additional factors may also be included, and the relative weighting of the factors will depend on details of the network such as, for example, number of links per node, overall network size, depth of the local neighborhood. The importance of the various factors and the weight that should be assigned to them will be learned from operational experience with the network.

For large local neighborhoods, this calculation is simpler than comparing physical locations of all perimeter nodes. Further, rather than repeating the definition of the sectors for every data packet, the definition of the sectors is repeated when the topology of the local neighborhood changes.

Figure 11:
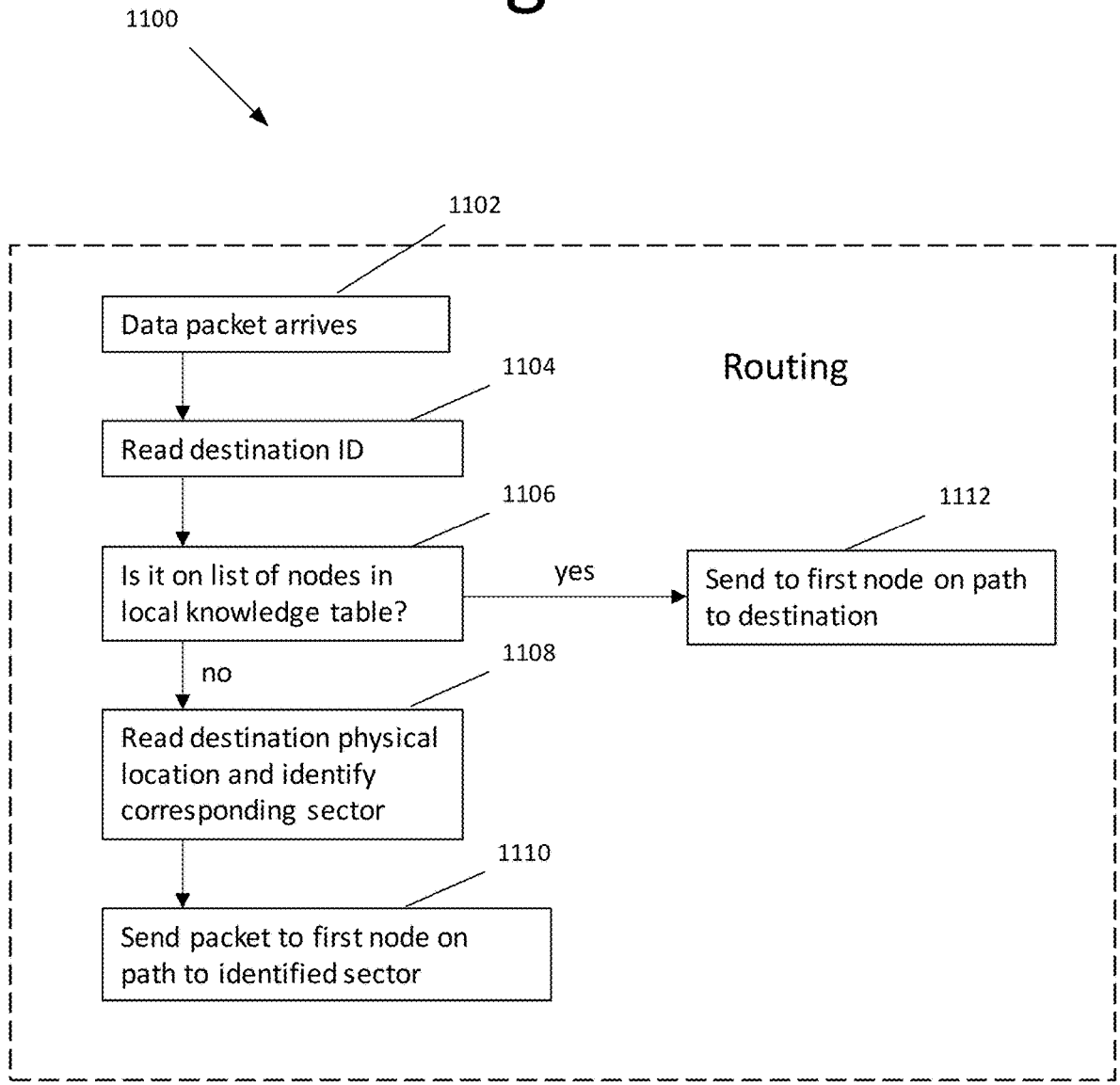
FIG. 11 is a flow diagram illustrating a process for routing the data packet to the first node on the path, according to an embodiment of the present invention.

FIG. 11 is a flow diagram illustrating a process 1100 for routing the data packet to the first node on the path, according to an embodiment of the present invention. In some embodiments, process 1100 begins at 1102 with the data packet arriving at the node. The node at 1104 reads the destination identification stored within the data packet. In some embodiments, the destination identification includes destination node information. At 1106, from the destination identification, the node determines if the destination node is on the list of nodes in the local knowledge table, and if so, at 1112, the node transmits the data packet to the first node on the path to the destination. Otherwise, at 1108, the node reads the physical location of the destination from the destination information and identifies the corresponding section for the destination node. At 1110, the node sends the data packet to the first node on the path for the identified section.

Returning back to FIG. 9, local neighborhood network 900 comprising sectors A-D to route outside of the local neighborhood. Although this embodiment shows four sectors in addition to the central zone CZ, a larger number of sectors, particularly when extending the concept to three dimensions, may be used.

Continuing with FIG. 9, there is no distinct physical boundary to the local neighborhood. For example, there are a number of network nodes not in the local neighborhood of central node 902 that are physically close to central node 902, and specifically, are closer than are most of the nodes that are in the local neighborhood of central node 902. This comes about because optical links are highly directional and tend to be long. If the average physical spacing of the nodes is short compared to the average link length, then there is a high probability that nodes physically nearby are more than n hops away, and thus not in the n-hop local neighborhood. As such, the paths to these nearby nodes (assuming the paths exist) are unknown. This presents a challenge for geographic routing, particularly in the extreme case where the node that is physically closest to the destination node is central node 902 of the local neighborhood.

This embodiment, as shown in FIG. 9, includes a central zone CZ with a radius that may encompass one or more network nodes. In some embodiments, these network nodes are physically close to central node 902 but are not part of the local neighborhood. In such an embodiment, the data packets addressed to these nodes may require special handling. For example, consider the case where the destination of a data packet is a node close to central node 902, and none of the nodes in the local neighborhood are closer to the destination node than the current node. In this example, the current node may send the data packet to the next closest node. However, when the packet reaches the next closest node, the next closest node may still not have the destination in its local neighborhood and the closest node to the destination will be the node of origin. In this instance, the packet will simply be sent back to where it came from.

This may be avoided for data packets going to the central zone by appending to the address a path list showing the identification numbers of the nodes that the data packet has already passed through. This way, repeats may be prohibited; if the node closest to the destination is one that has already been visited, then the packet is sent to a different node. By including the path list, the data packet is sent at each hop to a node where it has not previously been. This way, the data packet is staying relatively close to the destination until the data packet reaches a node that has the destination in its local neighborhood. This approach may prevent returns and loops, possibly at the expense of adding extra hops. In embodiments where the destination node is not connected to the network (for whatever reason), the packet is discarded after traversing some maximum number of hops.

In some embodiments, the radius of central zone CZ may be large compared to an average physical distance within the local neighborhood. In other embodiments, the radius of central zone CZ may be no larger than the distance to the most distant one-hop neighbor. For example, if the radius is relatively small (encompassing only a small fraction of the local neighborhood), then most non-local nodes will fall into one of the radial sectors, and therefore, not require special handling. If, however, the central zone is too small, then it is possible that a data packet will be sent to a radial sector node where the central zone is defined such that the data packet is simply sent back to its point of origin. In this case, the lack of special handling may result in data packets that bounce back and forth without getting any closer to their destination. It may also be useful to define two or more concentric local sectors. The ideal size of the central zone will have to be evaluated with modeling and/or operational experience, and will depend on the composition of the network.

In another embodiment, path tracking and prohibition of repeats may be used for all packets regardless of distance. While this may add some communications overhead, it has the benefit of eliminating even arbitrarily-large loops.

The process shown in FIGS. 5, 6, 8, 10 and 11 may be performed, in part, by a computer program, encoding instructions for a processor to cause at least the process described in FIGS. 5, 6, 8, 10 and 11 to be performed by the apparatuses discussed herein. The computer program may be embodied on a non-transitory computer-readable medium. The computer readable medium may be, but is not limited to, a hard disk drive, a flash device, a random-access memory, a tape, or any other such medium used to store data. The computer program may include encoded instructions for controlling the nonlinear adaptive processor to implement the process described in FIGS. 5, 6, 8, 10, and 11, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general-purpose computer, or an application-specific integrated circuit ("ASIC").

Some embodiments generally pertain to new protocols for network management and data packet routing in a large dynamic space network. For example, provisioning (making and breaking of links) and packet-routing decisions are made using protocols. These protocols can be executed autonomously on each network node using only local network topology knowledge to create a global-scale in-space communication network with autonomous distributed network management based on local network knowledge. In an embodiment, a "local neighborhood" is defined for each node in terms of the number of hops required for a message to move to another node. Each node maintains knowledge of the network topology for its own local neighborhood and makes provisioning and routing decisions based on protocols that depend on that local-neighborhood knowledge.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A communications network, comprising:
a plurality of nodes,
a plurality of currently-existing communications links, each of the plurality links connecting two nodes in the plurality of nodes, using high-precision ephemeris information, and
a plurality of n-hop local neighborhoods, wherein n is an integer greater than 1 and each n-hop local neighborhood in the plurality of n-hop local neighborhoods comprises:
one of the plurality of nodes being a central node around which the n-hop local neighborhood is defined, and
a subset of the plurality of nodes located within the n-hop local neighborhood of the central node, wherein
each node in the subset of the plurality of nodes is reached through a chain of not more than n hops over the plurality of currently existing links starting from the central node, wherein
when a link between the central node and one of the plurality of nodes is lost, the central node is configured to examine the n-hop local neighborhood identifying a replacement node, and initiate a new link with the replacement node and exchange corresponding local-neighborhood-knowledge tables with the replacement node.

2. The network of claim 1, wherein each one of the plurality of nodes is a central node within the n-hop local neighborhood specific to the each one of the plurality of nodes.

3. The network of claim 2, wherein each one of the plurality of nodes is configured to maintain and update a knowledge database, the knowledge database comprises a local-knowledge table of the n-hop local neighborhood for the each one of the plurality of nodes.

4. The network of claim 3, wherein the local-knowledge table comprises a physical location and velocity of the each of the subset of nodes, a number of hops to reach each node within the subset of nodes, and a first hop in a chain of nodes that leads to each node in the subset of nodes.

5. The network of claim 3, wherein each of the plurality of nodes periodically transmits to a node one hop away within the n-hop local neighborhood a table of data, the table of data comprises the local-knowledge table for nodes reachable within n−1 or fewer hops.

6. The network of claim 5, wherein each of the plurality of nodes periodically receives from the node one hop away within the n-hop local neighborhood the table of data, and updates the local-knowledge table.

7. The network of claim 1, wherein the central node is further configured to send a message over one or more existing links to the replacement node proposing a new link starting at a predetermined time.

8. The network of claim 7, wherein the message comprises the high-precision ephemeris information for the central node to support closing of an optical link with the replacement node.

9. The network of claim 7, wherein, when the replacement node accepts a proposal of the new link, the replacement node sends an acceptance message to the central node over one or more existing links, the message comprising high-precision ephemeris information of the replacement node.

10. The network of claim 9, wherein the central node is further configured to complete a handshake with the replacement node by confirming and sending the ephemeris information of the central node.

11. The network of claim 1, wherein the central node is further configured to propose a link with a non-local node, the non-local node being outside of the n-hop local neighborhood of the central node.

12. A system, comprising:
a plurality of nodes,
a plurality of n-hop local neighborhoods, wherein each of the plurality of n-hop local neighborhoods comprising:
a central node around which the n-hop local neighborhood is defined;
a subset of the plurality of nodes located within the n-hop local neighborhood of the central node, wherein
each of the subset of the plurality of nodes is not more than n hops away from the central node over currently existing links required to transmit a message between the central node and a destination node, and each one of the plurality of nodes is a central node of another group nodes considered to be within a n-hop local neighborhood for the each one of the plurality of nodes, wherein when a link between the central node and one of the plurality of nodes is lost, the central node is configured to examine the n-hop local neighborhood identifying a replacement node, and initiate a new link with the replacement node and exchange corresponding local-neighborhood-knowledge tables with the replacement node.

13. The system of claim 12, wherein each one of the central nodes is configured to maintain and update a knowledge database, the knowledge database comprises a local-knowledge table of the n-hop local neighborhood for the each one of the central nodes.

14. The system of claim 13, wherein the local-knowledge table comprises a physical location and velocity of the each of the subset of nodes, a number of hops to reach each node within the subset of nodes, and a first hop in a chain of nodes that leads to each node in the subset of nodes.

15. The system of claim 13, wherein each of the plurality of nodes periodically transmits to a node one hop away within the n-hop local neighborhood a table of data, the table of data comprises the local-knowledge table for nodes reachable within n−1 or fewer hops.

16. The system of claim 15, wherein each of the plurality of nodes periodically receives from the node one hop away within the n-hop local neighborhood the table of data, and updates the local-knowledge table.

17. The system of claim 12, wherein the central node is further configured to propose a link with a non-local node, the non-local node being outside of the n-hop local neighborhood of the central node.

\* \* \* \* \*